(12) United States Patent
Wessels

(10) Patent No.: US 6,774,529 B1
(45) Date of Patent: Aug. 10, 2004

(54) ROTOR BODY

(75) Inventor: Siegbert Wessels, Hildesheim (DE)

(73) Assignee: Robert Bosch GmbH, Stuttgart (DE)

( * ) Notice: Subject to any disclaimer, the term of this patent is extended or adjusted under 35 U.S.C. 154(b) by 221 days.

(21) Appl. No.: 09/889,063

(22) PCT Filed: Nov. 10, 2000

(86) PCT No.: PCT/DE00/04010

§ 371 (c)(1),
(2), (4) Date: Feb. 6, 2002

(87) PCT Pub. No.: WO01/36814

PCT Pub. Date: May 25, 2001

(30) Foreign Application Priority Data

Nov. 15, 1999 (DE) ............................ 199 55 050

(51) Int. Cl.[7] .................................. H02K 1/22
(52) U.S. Cl. .................... 310/261; 310/216; 310/264; 310/78
(58) Field of Search ............................ 310/261, 262, 310/264, 267, 268, 270, 216–218, 76, 78, 92, 102 R, 102 A, 113; 290/46–48

(56) References Cited

U.S. PATENT DOCUMENTS

| | | | | |
|---|---|---|---|---|
| 2,683,233 A | * | 7/1954 | Ruhl | ............................ 310/270 |
| 3,783,319 A | * | 1/1974 | Yamamura et al. | .......... 310/268 |
| 4,894,570 A | * | 1/1990 | Kaneyuki | .................... 310/113 |
| 5,103,127 A | * | 4/1992 | Peter | ........................... 310/113 |
| 5,118,978 A | * | 6/1992 | Matsumoto et al. | ......... 310/153 |
| 5,239,218 A | * | 8/1993 | Hashimoto et al. | ........ 310/68 B |
| 5,530,305 A | * | 6/1996 | Krueger et al. | ................ 310/74 |
| 5,955,807 A | * | 9/1999 | Kajiura et al. | .......... 310/156.66 |

FOREIGN PATENT DOCUMENTS

| | | |
|---|---|---|
| DE | 33 01 245 A | 7/1984 |
| DE | 199 05 538 A | 8/2000 |
| DE | 100 06 002 A | 12/2000 |
| EP | 0 952 335 A | 10/1999 |

OTHER PUBLICATIONS

Wiedemann E et al: "Die Hauelemente Elektrischer Maschinen . . . ", Konstruktion Elektrischer Maschinen, De Springer Verlag, Berlin, pp. 267–273, Jul. 11, 2001.

* cited by examiner

*Primary Examiner*—Dang Le
(74) *Attorney, Agent, or Firm*—Michael H. Striker

(57) ABSTRACT

The invention relates to a rotor body, especially for the rotor of the starter or the starter-generator of an internal combustion engine. Said rotor body is provided with a hub (4) that extends coaxially with respect to the axis of rotor rotation (A). The inventive rotor body comprises a rotation-symmetric base body (5) that forms the hub (4) and one or more blades (1, 2, 3) that all have the same thickness in the direction of the rotor rational axis (A).

15 Claims, 4 Drawing Sheets

ROTOR BODY

The invention relates to a rotor body, in particular for the rotor of the starter or the starter-generator of an internal combustion engine, with the characteristics mentioned in the preamble of claim 1.

Prior Art

Rotor bodies of this generic type are known. Rotor bodies of this kind can be components of an electric motor which in turn is a component of a starter for the motor of an internal combustion engine.

The electric motors used to start internal combustion engines are direct-current motors, alternating current motors, and rotary current motors. The electrical direct-current inverse-speed motor is particularly suitable for use as a starter motor since it produces the high initial torque required to overcome the initial rotation resistance and to accelerate the [drivetrain] masses.

The torque of the starter is predominantly transmitted via a pinion and a ring gear to the flywheel on the crankshaft of the internal combustion engine. Occasionally, though, V-belts, toothed belts, chains or direct transmission to the crankshaft are also chosen. However, due to the high ratio of transmission between the starter pinion and the ring gear of the motor disk flywheel, the pinion starter is best suited for a starting procedure since it can be designed for a lower torque at high speeds. This design makes it possible to keep the dimensions and weight of the starter down.

In addition to starters of this kind, so-called starter-generators are also known, which can be used as the starter for the internal combustion engine, as a drive motor of the vehicle, and as generators.

The coupling with the internal combustion engine and/or a transmission as well as the disposition of such starter-generators can differ from the simple starter due to the expanded intended application.

However, such starter-generators frequently have a rotor body of the type that defines the species.

The form of the rotor body of this generic type is frequently complex. This can depend, for example, on screw-connecting pieces to be provided, to which an intermediary clutch flange can be fastened. This complex form of the rotor body has the disadvantage that the rotor body production is very costly because it is only possible through a combination of turning, milling and/or stamping processes executed on one and the same work piece. The production of the rotor body is therefore time-consuming, costly, and in addition, a large quantity of waste is generated during production.

Advantages of the Invention

The rotor body according to the invention can be produced comparatively simply and therefore inexpensively. Because the rotor body is comprised of a rotationally symmetrical base body, which constitutes the hub, and one or more lamellas, which each have a continuously uniform thickness in the direction of the rotational axis of the rotor, the individual components of the rotor can be at least predominantly produced by means of a single machining method which is particularly suited for the respective form.

The rotor body design according to the invention is particularly advantageous if it is a non-rotationally symmetrical rotor body which would be particularly expensive to produce by means of known machining methods.

The production of the rotationally symmetrical base body which constitutes the hub can take place, for example, by means of turning.

However, it is likewise conceivable to produce the hub as a stamped, drawn, and bent part which can, for example, be riveted to the lamellas.

The term "rotationally symmetrical" should not be understood here in the strictly mathematical sense, but rather with regard to the machining method used, so that for example bores which are provided at separate locations on a base body produced by turning do not absolutely have to be symmetrical.

The lamellas can be stamp-bundled or can be individually produced lamellas. The use of stamp-bundled lamellas, which can be comprised of a number of congruent plates produced by means of stamping, permits a particularly inexpensive production.

Optionally, the base body can also be a stamp-bundled part so that as a whole, there is a total of one bundled unit after assembly of the rotor.

In order to assemble the rotor body, it is necessary that the individual lamellas be connected to the base body. If one or more of the individual lamellas is in the form of stamp-bundled lamellas, the individual lamellas can first be assembled using suitable connecting means and then can be connected to the base body. It is likewise conceivable for both the individual lamella components and the base body to be connected using the same connecting means.

These connecting means can, for example, be constituted by screws and/or pins and/or bolts and/or rivets.

Preferably, the outer circumference region of the rotor body is constituted by one or more lamellas. The rotor winding, which as a rule is provided on the outer circumference region, can then be disposed directly on the lamella or lamellas.

The transmission of force from the rotor body to the clutch then preferably takes place directly by means of one or more lamellas so that the connection between the base body and the lamellas is only subjected to a smaller amount of stress than would be the case if the force were to be transmitted from the lamellas into the base body and from there into the clutch.

For purposes of the above-mentioned transmission of force, one or more lamellas preferably constitute a connecting region which is provided for connecting the rotor body to at least one clutch element.

A clutch element can, for example, be constituted by an intermediary clutch flange. Alternatively, or in addition, the clutch element can also, for example, be constituted by a clutch thrust plate, where the specific design of the clutch elements can depend, for example, on the starter type.

A reinforcing ring can be provided to protect the rotor winding. This reinforcing ring is connected to the rotor body by connecting means, wherein these connecting means can either be constituted by the connecting means used to connect the rotor components or can be separate from them. The reinforcing ring itself can either be a deep-drawn part or a formed part.

For the case in which it is a short circuit rotor that represents a cage rotor, the short circuit cage, which is used in this type of rotor and is comprised of rods and short circuit rings or can be embodied of one piece, constitutes the rotor winding.

The outer circumference of the rotor body is preferably cylindrical wherein for example, two essentially annular lamellas can each constitute a section of this outer circumference.

At least one of the lamellas is preferably connected to the base body.

If three essentially annular lamellas are provided, each of which constitutes a section of the cylindrical outer circumference region of the rotor body, preferably only the middle lamella is connected to the base body, where in this instance, the lamellas are interconnected through the use of connecting means which can simultaneously be used for the attachment of the above-mentioned reinforcing ring.

If teeth serving as a pulse generator are provided, they are preferably constituted by the inner geometry of at least one essentially annular lamella.

Depending upon the embodiment, adjusting springs or similarly acting means can be provided to encourage the torque transmission between the individual rotor body components; for reasons relating to cost and weight, they should only be used if the specific embodiment actually requires it.

The above-mentioned and additional advantageous embodiments and modifications of the invention ensue from the dependent claims.

DRAWINGS

Exemplary embodiments of the invention, in which the rotor body according to the invention has a non-rotationally symmetrical form and is provided for use in a starter-generator for an internal combustion engine, will be explained in detail below in conjunction with the accompanying drawings.

DESCRIPTION OF THE EXEMPLARY EMBODIMENTS

Figure 1:
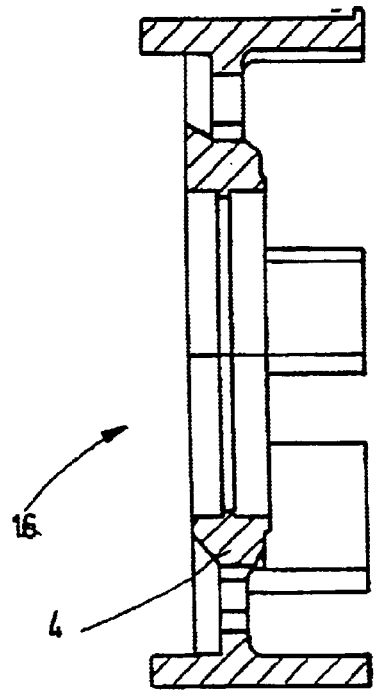
FIG. 1 is a first sectional view of a known, non-rotationally symmetrical rotor body.
Figure 2:
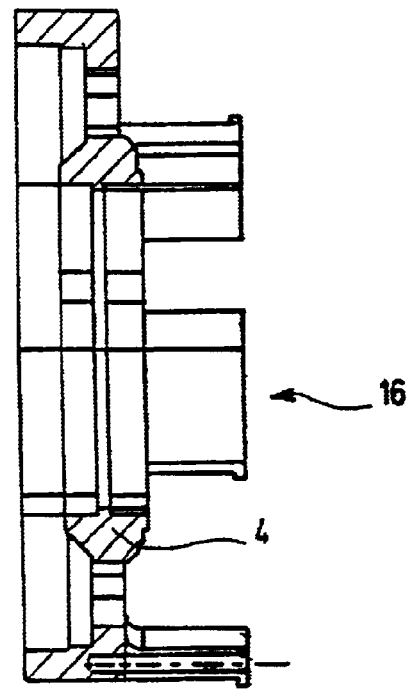
FIG. 2 is a second sectional view of the rotor body according to FIG. 1.
Figure 3:
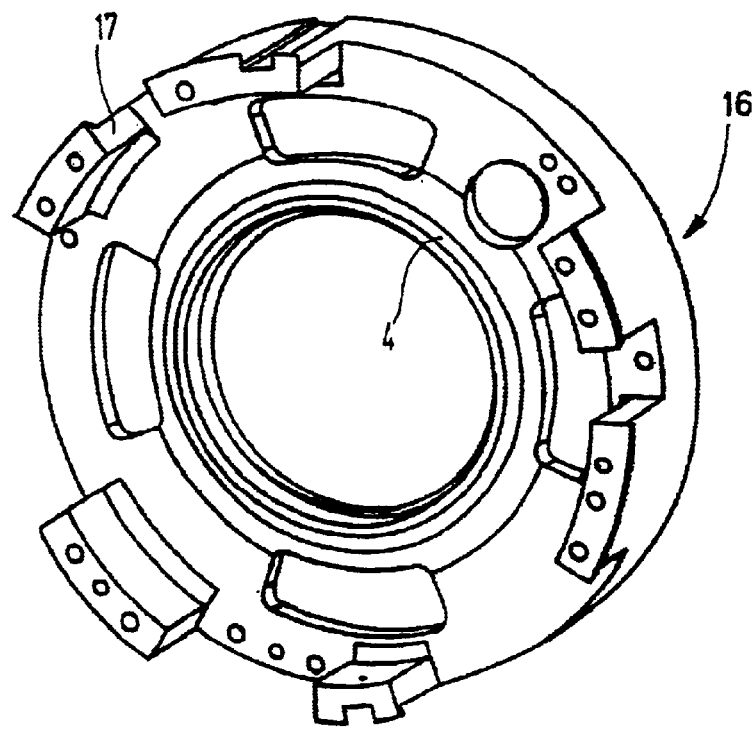
FIG. 3 is a perspective representation of the known rotor body according to FIG. 1.

FIGS. 1 to 3 depict a non-rotationally symmetrical rotor body of the type that defines the species, which belongs to the prior art and is labeled as a whole with the reference numeral 16.

It can easily be inferred, particularly from FIG. 3, that a rotor body of this kind, whose asymmetry is due, for example, to the presence of screw-connecting pieces 17, can be manufactured of one piece only as an extremely complex turned and milled part, which results in high costs and a large amount of waste.

Figure 4:
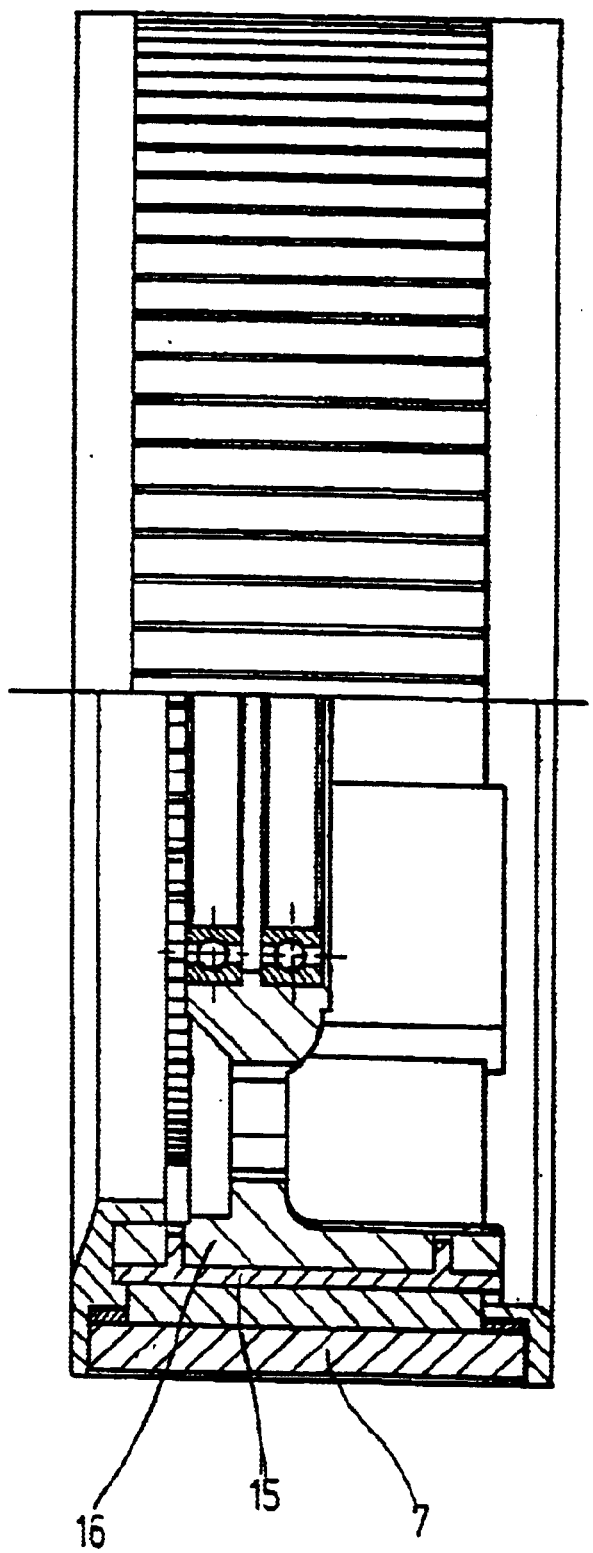
FIG. 4 is a partially sectional view of a known rotor which contains the known rotor body according to FIG. 1.

FIG. 4 shows a known rotor, which includes the rotor body 16 according to FIGS. 1 to 3. In this known rotor, the torque exerted on the rotor winding and/or the short circuit cage 7 is transmitted to the rotor body 16 by means of adjusting springs 15. The force is transmitted from the rotor body 16 to a clutch device that is not shown.

Figure 5:
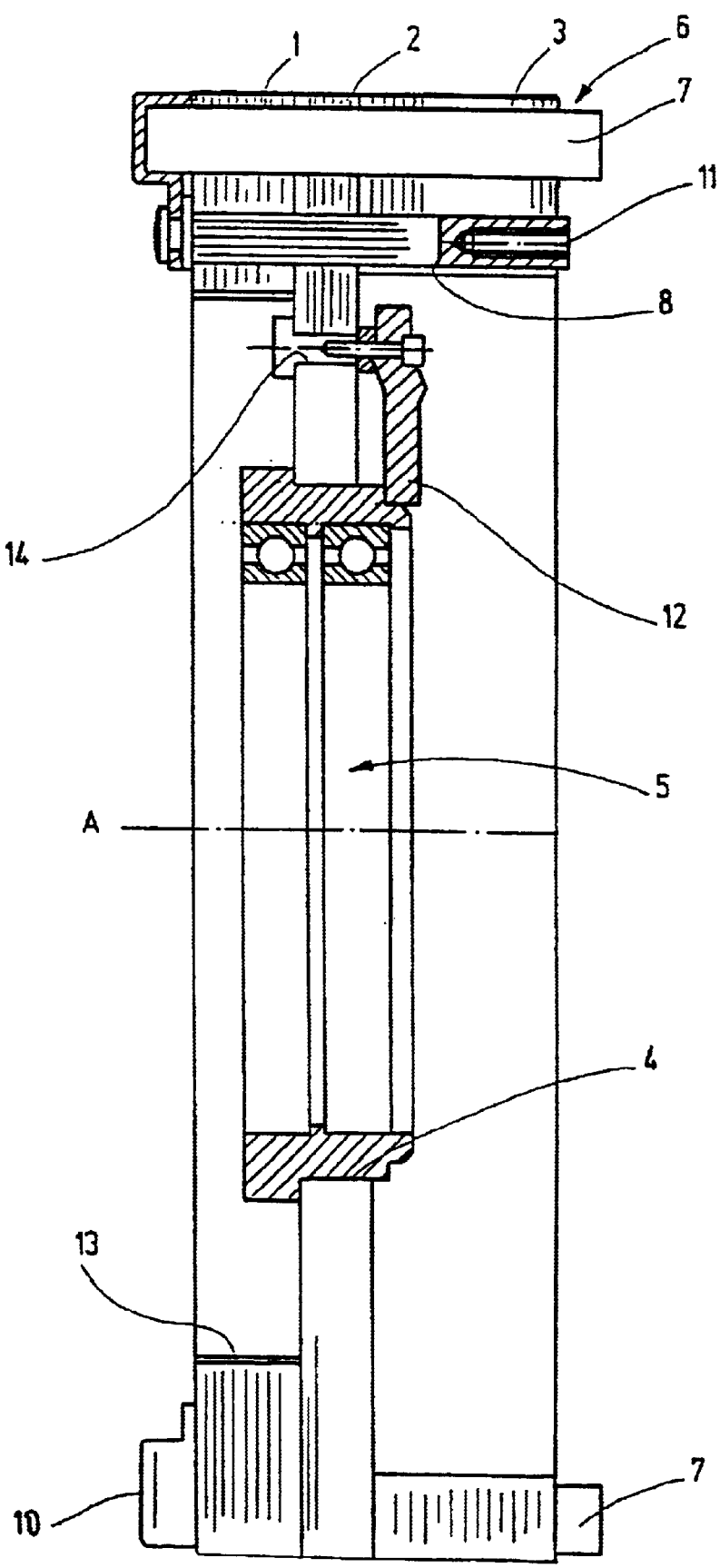
FIG. 5 is a partially sectional view of a first embodiment of the rotor body according to the invention.

In the embodiment of the current invention shown in FIG. 5, the rotor body is comprised of a rotationally symmetrical base body 5 and three lamellas 1, 2, 3. Because of the rotational symmetry of the base body 5 comprising the hub 4, it can be manufactured in one work cycle, for example by means of turning. The non-rotationally symmetrical sections of the rotor body are constituted by the lamellas 1, 2, 3, which always have the same thickness in the direction of the rotational axis A.

The three different lamellas 1, 2, 3 are combined into a bundle by means of a connecting pin 8.

In comparison to the known rotor body according to FIGS. 1 to 3, the design according to the invention permits a low-waste production since less stamping waste occurs.

In addition, the rotor body according to the invention permits a more highly integrated design since the pulse generator lamellas used in the prior art are constituted by the inner geometry of the lamella 1, in fact by the teeth 13.

The inner contour of the lamella 2 constitutes the receiving bore of the hub 4, which is constituted by the base body 5.

The inner contour of the lamella 3 replaces the screw-connection pieces 17 provided in the prior art according to FIGS. 1 to 3, which had to be produced at a high cost in terms of materials and machining.

In the embodiment shown in FIG. 5, the rotor winding 7 is disposed in the cylindrical outer circumference region of the rotor body, which is constituted by the lamellas 1, 2, 3. As a result of this design, the force can be transmitted directly from the bundle constituted by the lamellas 1, 2, 3 into the clutch. In FIG. 5, a clutch thrust plate 12 is shown and the intermediary flange of the clutch can be screw-connected in region 11.

The adjusting springs 15 required for torque transmission in the prior art according to FIGS. 1 to 3 can be omitted in the embodiment shown in FIG. 5 because the output does not take place via the base body 5, as mentioned above.

The reinforcing ring 10 shown in FIG. 5, which can be a deep-drawn part or a formed part, is preferably fastened by means of the connecting pin 8, but other types of attachment are also conceivable, for example screws, rivets, or caulking.

Figure 6:
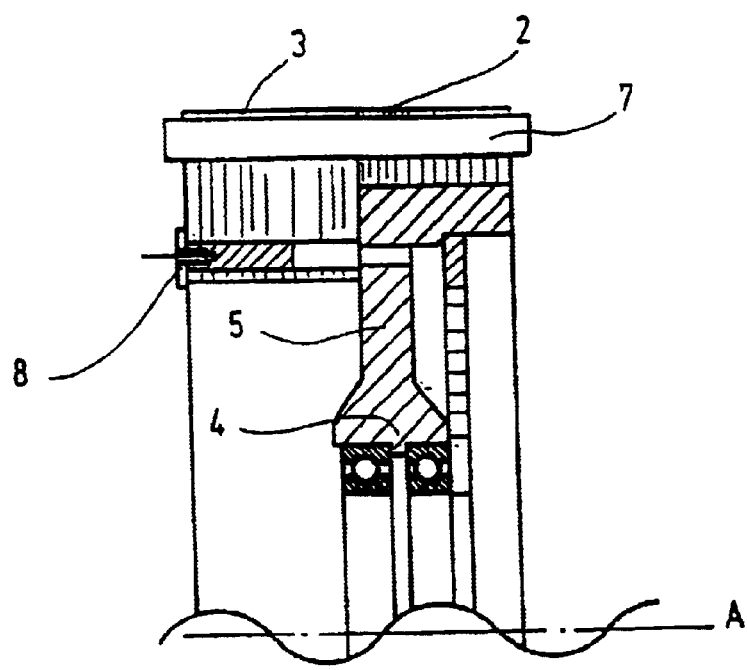
FIG. 6 is a sectional view of a second embodiment of the rotor body according to the invention.

FIG. 6 shows an alternative embodiment in which the rotor body is constituted by a base body 5 and two lamellas 2, 3.

In this embodiment, the lamella 3 is connected via connecting means 8 to the base body 5, which in this instance also constitutes the hub 4. The lamella 2 encompasses the base body 5 coaxially, where the thickness of the lamella 2 is adapted to the cylindrical outer circumference region of the base body 5. In this embodiment as well, the screw-connection pieces are constituted by the lamella 3.

In this embodiment, the torque exerted on the rotor winding 7 can be transmitted to the base body 5, for example by means of adjusting springs not shown here. The force can then be transmitted from the base body 5, via connecting means 8 constituted by bolts, to the lamella 3, and from there, for example, to the clutch.

Figure 7:
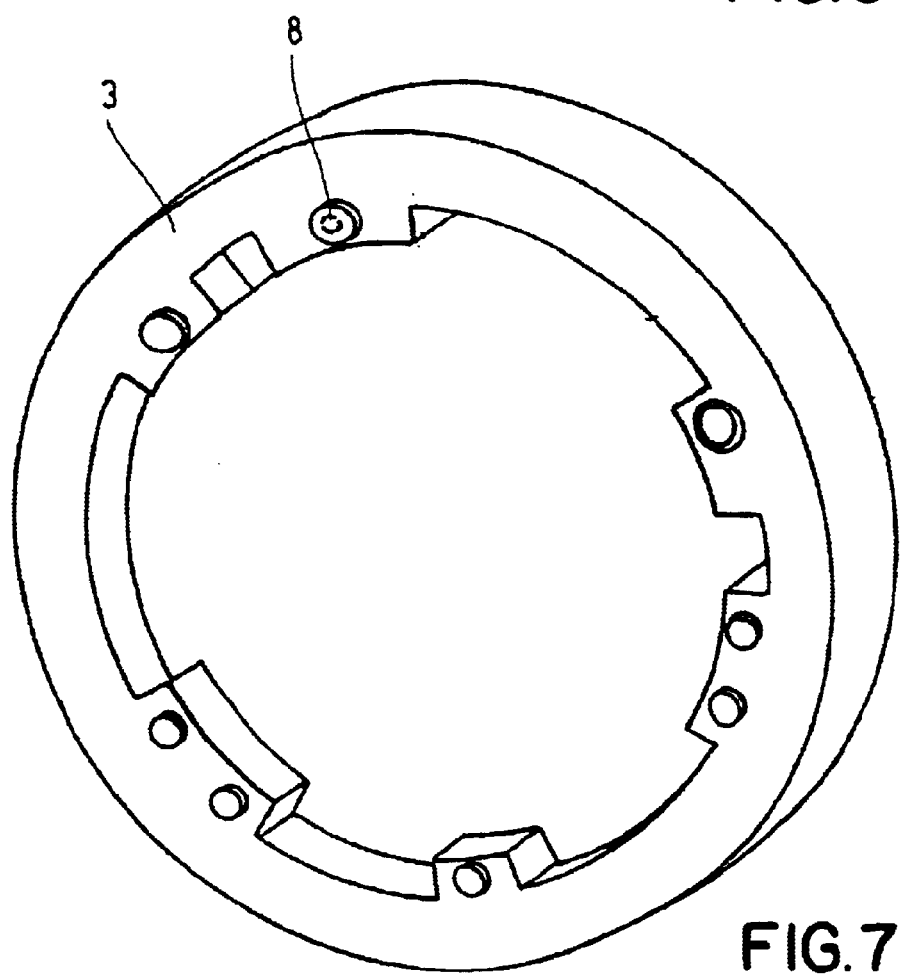
FIG. 7 shows a lamella which is a component of the rotor body according to the invention, according to FIG. 6.

FIG. 7 is a perspective depiction of the lamella 3; it is not necessary for the design of this lamella to differ from the design of the lamella 3 according to FIG. 5.

Independent of the respective embodiment, the individual lamellas 1, 2, 3 can be separate or in the form of a stamped bundle; stamp-bundling is considered to be particularly inexpensive.

Although the exemplary embodiments involve a non-rotationally symmetrical rotor body, the present invention is not limited to a rotor body of this kind.

As has already been mentioned, it is likewise conceivable for the entire rotor body to be in the form of a bundled unit.

What is claimed is:

1. A rotor body for the rotor of the starter or the starter-generator of an internal combustion engine, comprising a hub (4) extending coaxial to the rotational axis (A) of the rotor, wherein the rotor body is comprised of a rotationally symmetrical base body (5), wherein said base body constitutes the hub (4), and one or more lamellas (1, 2, 3), wherein each lamella has a continuously uniform thickness in the direction of the rotational axis (A) of the rotor, and wherein at least one lamella (3) has rotationally asymmetrical screw-connecting pieces (17), said screw connecting pieces (17) being constituted by the lamella (3) and protruding radially inwardly of the lamella (3).

2. The rotor body according to claim 1, wherein one or more of the lamellas (1, 2, 3) are stamp-bundled lamellas or are individually produced lamellas.

3. The rotor body according to claim 1, wherein individual lamella components and/or individual lamellas and/or the base body (5) are connected through the use of connecting means (8).

4. The rotor body according to claim 1, wherein the connecting means (8) are constituted by screws and/or pins and/or bolts and/or rivets.

5. The rotor body according to claim 1, wherein a region (6) for containing the rotor winding (7) is provided on an outer circumference region of said rotor body, which is constituted by one or more lamellas (1, 2, 3).

6. The rotor body according to claim 1, wherein one or more lamellas (1, 2, 3) constitute at least one connecting region (11, 14), wherein said at least one connecting region is provided for connecting the rotor body to at least one clutch element.

7. The rotor body according to claim 1, wherein at least one clutch element is constituted by an intermediary clutch flange and/or a clutch element is constituted by a clutch thrust plate (12).

8. The rotor body according to claim 1, wherein means (8) are provided for fastening a reinforcing ring (10), wherein said reinforcing ring covers at least parts of the rotor winding (7).

9. The rotor body according to claim 1, wherein the reinforcing ring is constituted by a deep-drawn part or a formed part.

10. The rotor body according to claim 1, wherein an outer circumference of said rotor body is cylindrical and that two essentially annular lamellas (2, 3) are provided, wherein each of said essentially annular lamellas constitute a section of the outer circumference.

11. The rotor body according to claim 1, wherein at least one of the lamellas (2) is connected to the base body.

12. The rotor body according to claim 1, wherein three essentially annular lamellas (1, 2, 3) are provided, wherein each essentially annular lamella constitutes a section of the cylindrical outer circumference region of the rotor body, and wherein only the middle lamella (2) is connected to the base body (5).

13. The rotor body according to claim 1, wherein the inner geometry of at least one essentially annular lamella (1) constitutes teeth (13) that serve as a pulse generator.

14. The rotor body according to claim 1, wherein adjusting springs or similarly acting means are provided in order to encourage the torque transmission between the rotor body components.

15. The rotor body according to claim 1, wherein the base body (5) is a part produced by turning and/or a stamped, drawn, and bent part and/or a stamp-bundled part.

* * * * *